United States Patent
Tang

(10) Patent No.: US 8,717,984 B2
(45) Date of Patent: May 6, 2014

(54) CHANNEL STATUS DETERMINATION METHOD AND RELATED WIRELESS LOCAL AREA NETWORK SYSTEM AND DIRECT LINK SETUP METHOD

(75) Inventor: Sung-Chien Tang, Taoyuan County (TW)

(73) Assignee: Ralink Technology Corp., Jhubei, Hsinchu County (TW)

(*) Notice: Subject to any disclaimer, the term of this patent is extended or adjusted under 35 U.S.C. 154(b) by 211 days.

(21) Appl. No.: 12/874,214

(22) Filed: Sep. 1, 2010

(65) Prior Publication Data

US 2011/0051678 A1   Mar. 3, 2011

(30) Foreign Application Priority Data

Sep. 2, 2009   (TW) ............................... 98129606 A

(51) Int. Cl.
  *H04W 4/00*    (2009.01)
  *G06F 15/16*   (2006.01)
  *H04W 76/02*   (2009.01)
  *H04W 8/00*    (2009.01)
  *H04W 84/18*   (2009.01)
  *H04L 29/06*   (2006.01)

(52) U.S. Cl.
  CPC ............ *H04W 76/023* (2013.01); *H04W 84/18* (2013.01); *H04W 8/005* (2013.01); *H04L 69/28* (2013.01)
  USPC ........... 370/329; 370/331; 370/338; 709/227; 709/231; 455/436

(58) Field of Classification Search
  CPC ... H04W 76/023; H04W 84/18; H04W 8/005; H04W 48/16; H04L 69/28
  USPC ......... 370/248, 254, 255, 328, 329, 331, 338, 370/352, 278, 310, 389; 709/231, 238, 709/203–228; 714/1, 12; 717/173; 455/436–437
  See application file for complete search history.

(56) References Cited

U.S. PATENT DOCUMENTS

| 6,182,135 | B1 * | 1/2001 | Ruane et al. | 709/224 |
| 6,674,738 | B1 * | 1/2004 | Yildiz et al. | 370/338 |
| 7,251,235 | B2 | 7/2007 | Wentink | |

(Continued)

FOREIGN PATENT DOCUMENTS

| CN | 101288267 A | 10/2008 |
| WO | 2008010007 A1 | 1/2008 |

OTHER PUBLICATIONS

"802.11 Wireless Networks: The Definitive Guide, Second Edition", by Mathew Gast, Published by O'Reilly Media Inc, on Apr. 25, 2005, pp. 71, 82-83, 106-107.*

(Continued)

*Primary Examiner* — Wing F Chan
*Assistant Examiner* — Raji Krishnan
(74) *Attorney, Agent, or Firm* — Winston Hsu; Scott Margo

(57) ABSTRACT

A method for determining a channel status between a first station and a second station in a wireless local area network system includes the first station receiving a beacon from an access point. The first station broadcasts a packet carrying the beacon. The packet provides a basis for the second station to determine the channel status between the first station and the second station.

21 Claims, 7 Drawing Sheets

(56) References Cited

U.S. PATENT DOCUMENTS

| | | |
|---|---|---|
| 2003/0156558 A1* | 8/2003 | Cromer et al. ............... 370/331 |
| 2005/0036469 A1* | 2/2005 | Wentink ...................... 370/338 |
| 2006/0268746 A1 | 11/2006 | Wijting |
| 2007/0008922 A1* | 1/2007 | Abhishek et al. ............ 370/329 |
| 2007/0171910 A1 | 7/2007 | Kumar |
| 2008/0069047 A1* | 3/2008 | Yee et al. .................... 370/331 |
| 2009/0059873 A1* | 3/2009 | Weil et al. ................... 370/338 |
| 2009/0213771 A1* | 8/2009 | Celentano et al. ........... 370/310 |
| 2010/0210266 A1* | 8/2010 | Laroia et al. ................ 455/436 |

OTHER PUBLICATIONS

"802.11 wireless Networks: The Difinitive Guide, Second Edition" by Mathew Gast, Published by O'Reilly Media Inc., on Apr. 25, 2005, pp. 71, 82-83, 91, 106-107, 109.*

"TW 098129606 SR.pdf" Search Report for the TWN patent Application.*

"TWI400898 B.pdf" granted TWN patent for the TW098129606 application.*

* cited by examiner

CHANNEL STATUS DETERMINATION METHOD AND RELATED WIRELESS LOCAL AREA NETWORK SYSTEM AND DIRECT LINK SETUP METHOD

BACKGROUND OF THE INVENTION

1. Field of the Invention

The invention relates to a channel status determination method and related wireless local area network system and direct link setup method, and more particularly, to a channel status determination method providing a basis for determining a channel status between stations via the stations forwarding beacons of access points (APs), and wireless local area network system and direct link setup method using the same.

2. Description of the Prior Art

In the modern information society, a wireless communication system has become one of the most important ways for exchanging sounds, text messages, data, and video files, etc. In order to improve the quality of communication, the prior art has disclosed various wireless communication technologies for enhancing the spectrum efficiency and transmitting rate of the wireless communication system.

For example, in a wireless communication system conforming to WLAN (wireless local area network) standard IEEE 802.11, a station does not transmit data directly to another station but through access points (APs). Such transmission procedure decreases data throughput; thus, IEEE 802.11e defines a direct link setup (DLS) function allowing data transmission between stations, so as to increase data throughput. Operations thereof are briefly described as follows.

Please refer to FIG. 1. FIG. 1 is a schematic diagram of a WLAN system 10. In the WLAN system 10, if a station 102 intends to transmit data directly to a station 104 via DLS, the station 102 first outputs a DLS request message DLS_Request to an access point 100. The DLS_Request comprises information of a transmitting rate and ability of the station 102, and medium access control (MAC) addresses of the stations 102 and 104. When the access point 100 receives the DLS request message DLS_Request from the station 102, if the access point 100 allows DLS and has confirmed existence of the station 104, the access point 100 forwards the DLS request message DLS_Request to the station 104. When the station 104 receives the DLS request message DLS_Request forwarded by the access point 100, the station 104 responds a DLS response message DLS_Response through the access point 100 to the station 102. If the station 102 successfully receives the DLS response message DLS_Response forwarded by the access point 100, the station 102 and the station 104 start to transmit data without forwarding of the access point 100.

As can be seen from the above, to establish DLS between the station 102 and the station 104, a user must acquire (or have an ability to acquire) MAC addresses of the stations 102 and 104, and then keys or inputs the MAC addresses into a DLS software. Such a procedure is inconvenient, especially for those who lack advanced network knowledge.

In addition, in the process of establishing DLS between the station 102 and the station 104, as long as the DLS request message DLS_Request outputted from the station 102 is accurately transmitted to the station 104 and the DLS response message DLS_Response is accurately transmitted to the station 104, the station 102 and the station 104 can successfully establish DLS. In other words, once the connections between the access point 100 and the station 102 and between the access point 100 and the station 104 are operative, even if the connection between the station 102 and the station 104 can never be established, the prior art still determines DLS feasible, and hence results in operation problems thereafter.

Moreover, when the station 102 intends to terminate DLS, the station 102 outputs a DLS tear down message through the access point 100 to the station 104. When the station 104 receives the DLS tear down message, the station 104 stops the corresponding connection. However, besides the above situation, the prior art does not disclose when should the station 102 output the DLS tear down message. For example, after DLS is established, if the station 102 and the station 104 do not receive data because the connection between the station 102 and the station 104 is interrupted (or never established), or either the station 102 or the station 104 is out of a service area of the access point 100, the station 102 does not output the DLS tear down message.

Thus, the prior art DLS function needs to be improved.

SUMMARY OF THE INVENTION

It is therefore a primary objective of the claimed invention to provide a channel status determination method and related wireless local area network system and direct link setup method.

The present invention discloses a method for determining a channel status between a first station and a second station in a wireless local area network system, which comprises the first station receiving a beacon from an access point; and the first station broadcasting a packet carrying the beacon, to provide a basis for the second station to determine the channel status between the first station and the second station.

The present invention further discloses a method for determining a channel status between a first station and a second station in a wireless local area network system, which comprises the first station receiving a first beacon from an access point; the first station receiving a packet outputted by the second station, the packet carrying a second beacon; and the first station comparing the first beacon with the second beacon, to determine the channel status between the first station and the second station.

The present invention further comprises a wireless local area network system, which comprises a plurality of stations; and at least one access point, for providing services to the plurality of stations; wherein while a first station of the plurality of stations determines a channel status between the first station and a second station, the second station broadcasts a second packet carrying a second beacon, so that the first station is capable of comparing a first beacon with the second beacon, and determining the channel status between the first station and the second station; wherein the second beacon is outputted by an access point corresponding to the second station, and the first beacon is outputted by an access point corresponding to the first station.

The present invention further comprises a method for establishing a direct link setup (DLS) in a wireless local network system, which comprises a first station and a second station starting to establish the DLS; the first station broadcasting a plurality of first packets carrying a plurality of first beacons outputted by a first access point (AP), and the second station broadcasting a plurality of second packets carrying a plurality of second beacons outputted by a second AP, to determine whether the first AP is identical to the second AP and a channel status between the first station and the second station; and the first station and the second station establishing the DLS when the first AP is identical to the second AP, and the channel status between the first station and the second station is determined as feasible to establish a connection.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
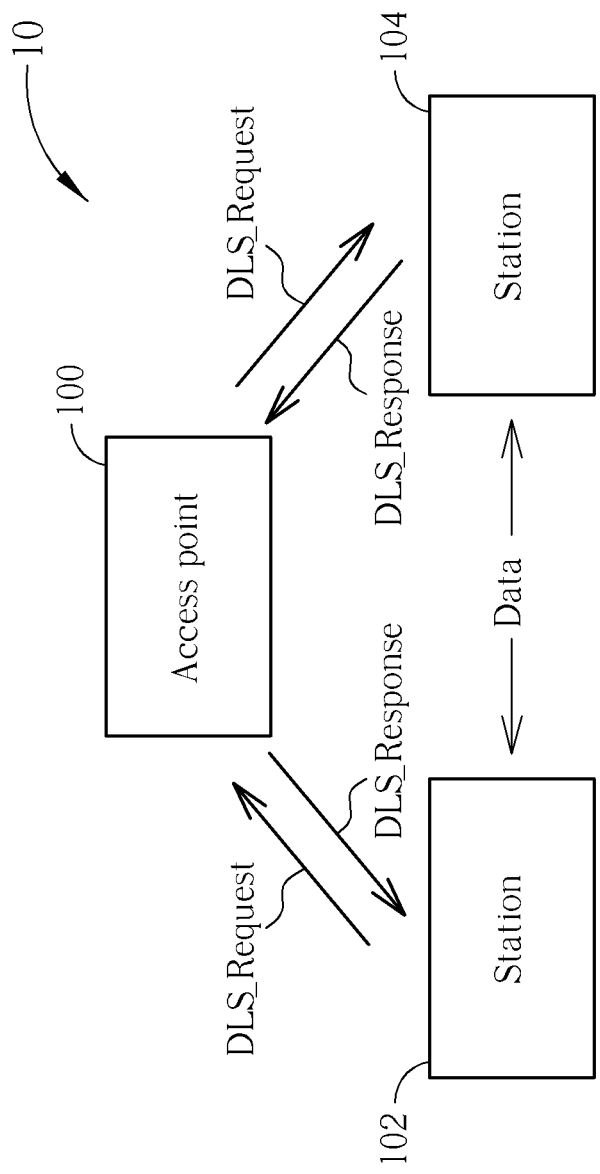
FIG. 1 is a schematic diagram of a wireless local area network according to the prior art.
Figure 2:
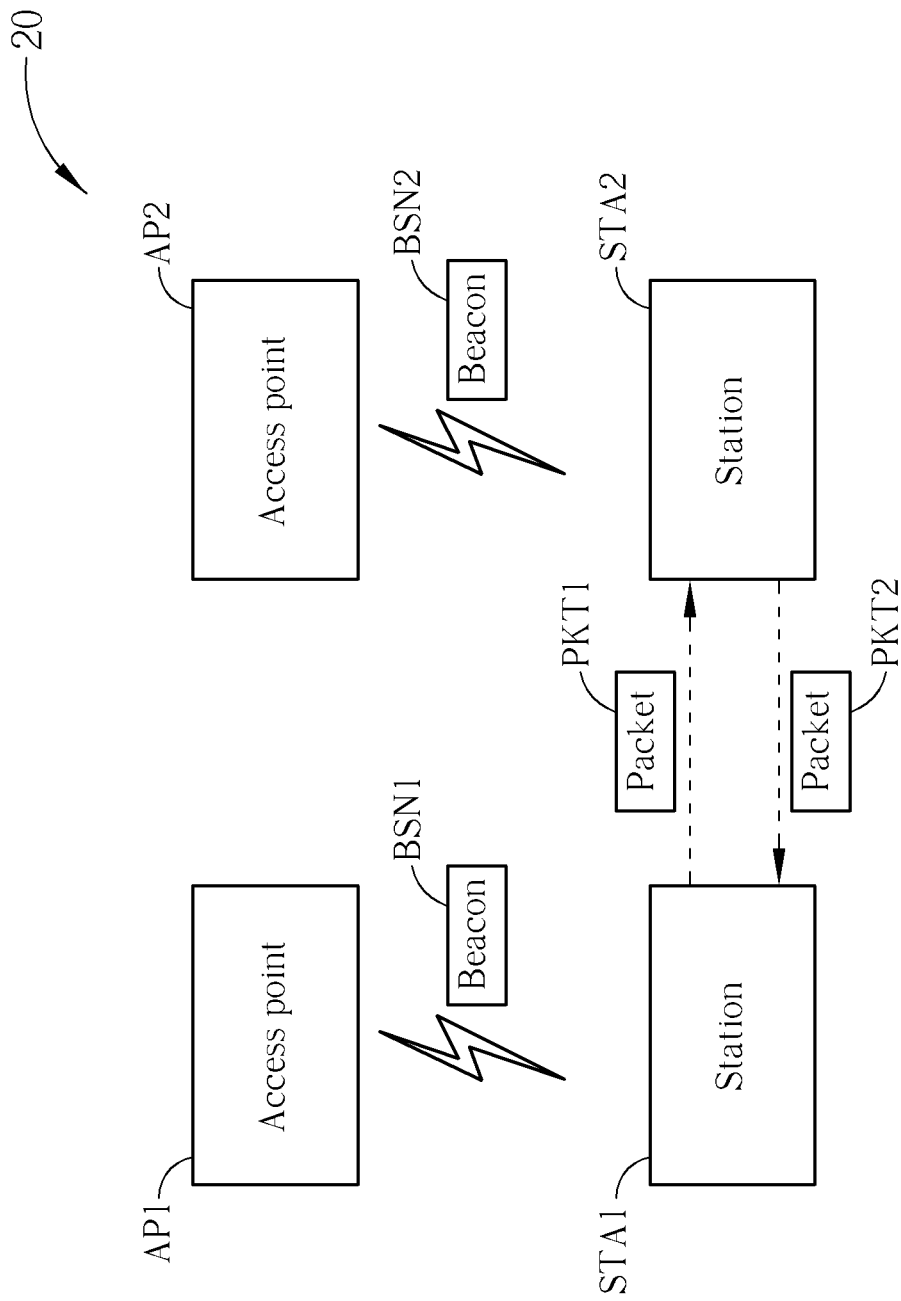
FIG. 2 is a schematic diagram of a wireless local network system according to an embodiment of the present invention.

Please refer to FIG. 2. FIG. 2 is a block diagram of a WLAN system 20 according to an embodiment of the present invention. The WLAN system 20 preferably adopts WLAN standard IEEE 802.11 or the like. In general, the WLAN system 20 comprises at least an access point, for serving a plurality of stations. For clarity, FIG. 2 illustrates stations STA1 and STA2, and corresponding access points AP1 and AP2 by a "station view". The "station view" means: because a station in the WLAN system 20 is unaware of whether another station belongs to the same basic service set, the stations STA1 and STA2 regard each other as serviced by different access points, as shown in FIG. 2. That is to say, even if the access point AP1 is identical to the access point AP2, when the station STA1 observes the station STA2 or the station STA2 observes the station STA1, the stations STA1 and STA2 regard each other as serviced by different access points. Therefore, while referring to FIG. 2, it should be noticed that the access points AP1 and AP2 are illustrated as two independent blocks because of the viewpoints of the stations STA1 and STA2; however, the access points AP1 and AP2 can either be identical or different.

Furthermore, in a WLAN system, to determine statuses of stations, an access point timely outputs beacons requiring the stations to response corresponding messages. Hence, in FIG. 2, the access points AP1 and AP2 output beacons BSN1 and BSN2 to the stations STA1 and STA2 for determining the statuses of the stations STA1 and STA2. It should also be noticed that if the access point AP1 is identical to the access point AP2, the beacon BSN1 is necessarily the same as the beacon BSN2. On the contrary, if the access point AP1 is different to the access point AP2, the beacon BSN1 is also different to the beacon BSN2. Under such circumstances, the present invention is to use the beacons outputted from the access points to determine a channel status between the station STA1 and the station STA2.

In detail, when determining the channel status between the station STA1 and the station STA2, the station STA1 broadcasts a packet PKT1 carrying the beacon BSN1 outputted by the access point AP1. When the station STA2 receives the packet PKT1, the station STA2 compares the beacon BSN1 in the packet PKT1 with the beacon BSN2 received from the access point AP2. If the beacon BSN1 is identical to the beacon BSN2, the station STA2 determines that the access point AP1 is identical to the access point AP2, and establishing a connection between the station STA1 and the station STA2 is feasible. On the contrary, if the beacon BSN1 is different to the beacon BSN2, the station STA2 determines that the access point AP1 is different to the access point AP2, and establishing a connection between the station STA1 and the station STA2 is not feasible. Similarly, the station STA2 also broadcasts a packet PKT2 carrying the beacon BSN2 outputted from the access point AP2. When the station STA1 receives the packet PKT2, the station STA1 compares the beacon BSN2 in the packet PKT2 with the beacon BSN1 received from the access point AP1. If the beacon BSN2 is the same as the beacon BSN1, the station STA1 determines that the access point AP1 is identical to the access point AP2, and establishing a connection between the station STA1 and the station STA2 is feasible. On the contrary, if the beacon BSN2 is different to the beacon BSN1, the station STA1 determines that the access point AP1 is different to the access point AP2, and establishing a connection between the station STA1 and the station STA2 is not feasible.

In brief, the station STA1 forwards the beacon BSN1 outputted from the access point AP1 via the packet PKT1 to the station STA2, and the station STA2 compares the beacon BSN1 and the beacon BSN2 to determine the channel status between the station STA1 and the station STA2. Likewise, the station STA2 forwards the beacon BSN2 outputted by the access point AP2 via the packet PKT2 to the station STA1, and the station STA1 compares the beacon BSN1 and the beacon BSN2 to determine the channel status between the station STA1 and the station STA2. Therefore, the present invention provides a basis to determine the channel status by forwarding beacons outputted from the access points, and the determination results can be further utilized in other applications, such as DLS, which is detailed thereinafter.

Figure 3:
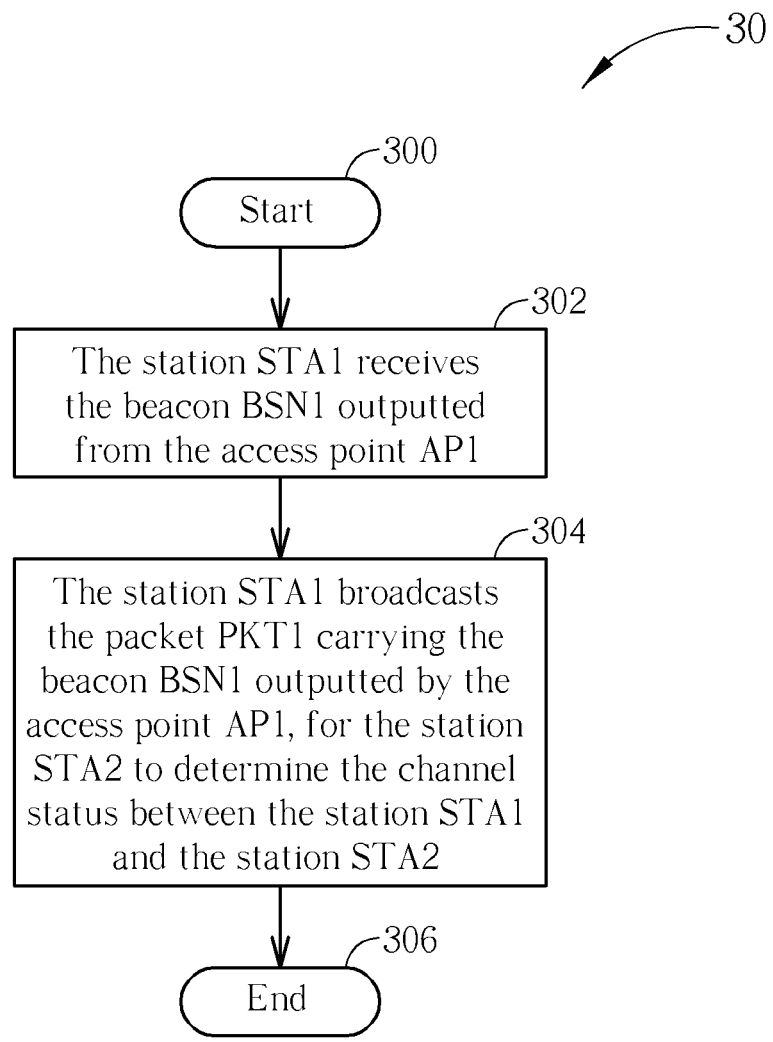
FIG. 3 is a schematic diagram of generating beacon packets of a station shown in FIG. 2.
Figure 4:
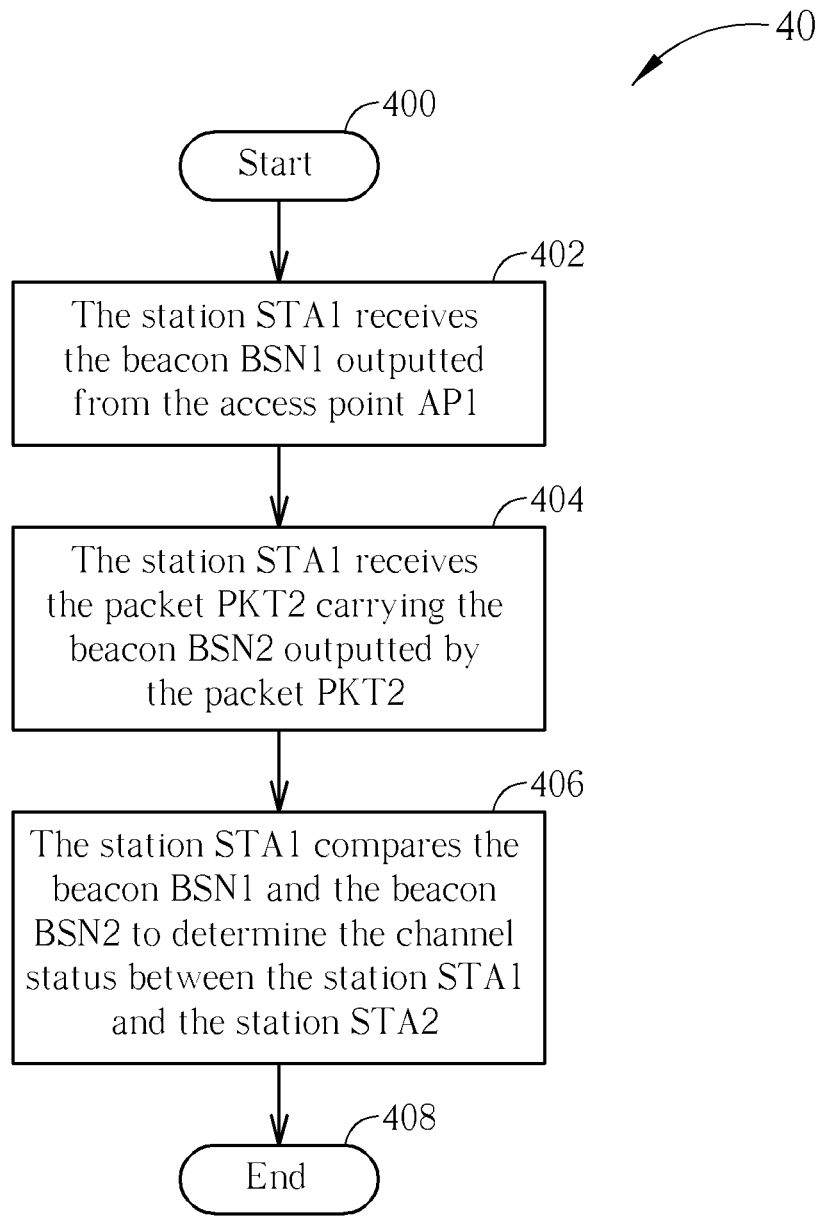
FIG. 4 is a schematic diagram of receiving beacon packets of a station shown in FIG. 2.

In FIG. 2, the station STA1 and the station STA2 both have abilities of generating and receiving "beacon packets", which indicate packets carrying beacons. For example, the station STA1 outputs the packet PKT1 carrying the beacon BSN1 for the station STA2 to determine the channel status, and in the meanwhile, receives the packet PKT2 outputted from the station STA2 to determine the channel status by itself. Since generating and receiving the beacon packets are corresponding to different operations of the stations while determining the channel status, these two operations are independent, and a station may not need to execute the whole according to system requirement. For example, in FIG. 2, if only the station STA1 needs to determine the channel status between itself and the station STA2, the station STA1 does not need to generate the packet PKT1, and only the station STA2 needs to generate and broadcast the packet PKT2. The above operations can be concluded into a process 30 in FIG. 3 and a process 40 in FIG. 4, respectively referring to operations of generating and receiving the beacon packets in the station STA1.

The process 30 comprises the following steps:
Step 300: Start.
Step 302: The station STA1 receives the beacon BSN1 outputted from the access point AP1.
Step 304: The station STA1 broadcasts the packet PKT1 carrying the beacon BSN1 outputted by the access point AP1 for the station STA2 to determine the channel status between the station STA1 and the station STA2.
Step 306: End.
The process 40 comprises the following steps:
Step 400: Start.

Step 402: The station STA1 receives the beacon BSN1 outputted from the access point AP1.

Step 404: The station STA1 receives the packet PKT2 carrying the beacon BSN2 outputted by the access point AP2.

Step 406: The station STA1 compares the beacon BSN1 and the beacon BSN2 to determine the channel status between the station STA1 and the station STA2.

Step 408: End.

Note that, the processes 30 and 40 depict the operations of the station STA1, whereas operations of the station STA2 can be obtained accordingly.

Via the process 30, when the station STA2 intends to determine the channel status between the station STA1 and the station STA2, the station STA1 broadcasts the packet PKT1, providing a basis for the station STA2 to determine the channel status. On the contrary, when the station STA1 intends to determine the channel status between the station STA1 and the station STA2, the station STA2 broadcasts the packet PKT2, and the station STA1 determines the channel status by comparing the beacon BCN1 and the beacon BCN2.

In addition, because the packet PKT1 and the packet PKT2 are utilized to determine the channel status and different from ordinary data or control packets, as for implementation of the packet PKT1 and the packet PKT2, an adequate identification mechanism can further be applied for distinguishing the beacon packets, i.e. the packet PKT1 and the packet PKT2, from the data packets and the control packets.

Figure 5:
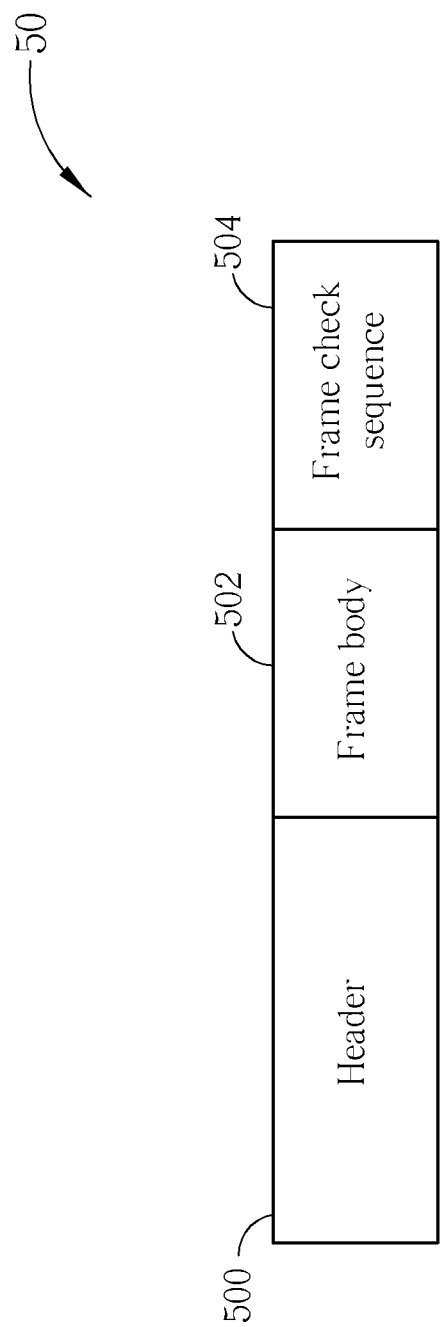
FIG. 5 is a schematic diagram of a medium access control frame.

For example, please refer to FIG. 5, which is a schematic diagram of a MAC frame 50 according to IEEE 802.11 WLAN standard. The MAC frame 50 is composed of a header field 500, a frame body field 502, and a frame check sequence field 504, which have been well defined in the related WLAN standard, and are abridged as follows. The header field 500 is utilized to carry control information irrelevant to data to be transmitted, and can be divided into multiple subfields, such as a frame control field, a duration/ID field, an address 1 field, an address 2 field, an address 3 field, etc. Data (or value) stored in each subfield must comply with a specific rule, i.e. protocol, to ensure the receiver can determine the format, size, and other information of the MAC frame 50 according to contents of the header field 500, so as to accurately process the MAC frame 50. Besides, the frame body field 502 is utilized to carry the data to be transmitted, with a variable or fixed length. If the field length of the frame body field 502 is variable, data carried by the body field 502 is named "information element". The information element is a data block, mainly composed of an element ID field, a length field, and a data field. In addition, the frame check sequence field 504 is utilized to check if the MAC frame 50 is accurately transmitted.

Note that, the MAC frame 50 illustrated in FIG. 5 complies with IEEE 802.11 standard; hence, allocation and meanings of the fields can be referred to for the related protocol. The MAC frame 50 is an example to illustrate how to add an identification mechanism for distinguishing the beacon packets from normal packets.

In order to distinguish the beacon packets from normal packets, when the packet PKT1 and the packet PKT2 are implemented according to the format of the MAC frame 50, a "To DS" field and a "From DS" field in the frame control field can be set to 1. The "To DS" field indicates whether the corresponding frame enters a distribution system in an infrastructure network, while the "From DS" field indicates whether the corresponding frame leaves a distribution system in an infrastructure network. The condition of "To DS"=1 and "From DS"=1 originally specifies that the frame is transmitted from an access point to another access point. In the embodiment of the present invention, the packets PKT1 and PKT2 including the beacons BSN1 and BSN2 respectively are similar to data outputted from the access points AP1 and AP2, such that the "To DS" field and the "From DS" field are both set to 1. Furthermore, the address 1 field, the address 2 field, and the address 3 field can be set to MAC addresses of a corresponding station, while the beacon is carried by an information element.

Note that, the above mechanism for identifying beacon packets, i.e. setting "To DS"=1, "From DS"=1, and addresses 1 to 3=MAC addresses of corresponding stations, is only an exemplary embodiment, in order to identify a beacon pocket in a typical frame format, and can be modified and varied by those skilled in the art. However, what should be noticed is that regardless of the format of the packets PKT1 and PKT2, the stations STA1 and STA2 should be able to identify the packets PKT1 and PKT2 are beacon packets, for example, by modifying firmware or hardware.

Figure 6:
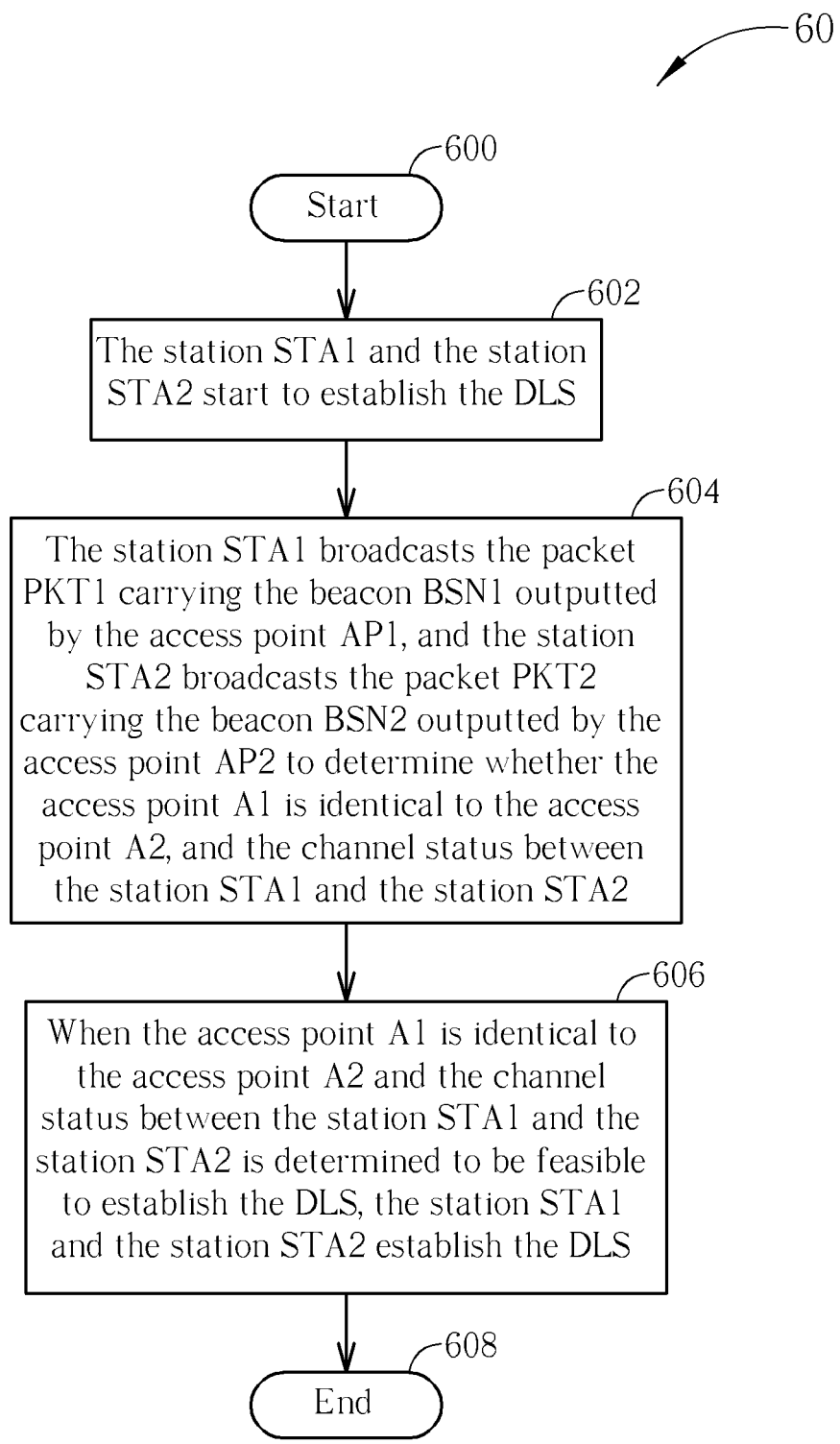
FIG. 6 is a flowchart of a process according to an embodiment of the present invention.

Therefore, the present invention provides a basis to determine the channel status by forwarding beacons, and the determination results can be further utilized in other applications. Take DLS establishment of the WLAN system 20 as an example. Please refer to FIG. 6. FIG. 6 is a flowchart of a process 60 according to an embodiment of the present invention. The process 60 is utilized for establishing DLS in the WLAN system 20, and comprises the following steps:

Step 600: Start.

Step 602: The station STA1 and the station STA2 start to establish DLS.

Step 604: The station STA1 broadcasts the packet PKT1 carrying the beacon BSN1 outputted by the access point AP1, and the station STA2 broadcasts the packet PKT2 carrying the beacon BSN2 outputted by the access point AP2 to determine whether the access point A1 is identical to the access point A2, and the channel status between the station STA1 and the station STA2.

Step 606: When the access point A1 is identical to the access point A2 and the channel status between the station STA1 and the station STA2 is determined to be feasible to establish DLS, the station STA1 and the station STA2 establish DLS.

Step 608: End.

According to the process 60, when the station STA1 and the station STA2 intend to start DLS, the station STA1 and the station STA2 forward beacons, to determine whether the corresponding access points are identical and whether the channel status between the station STA1 and the station STA2 is feasible to establish a connection. Not until the determination result shows that the access point AP1 is identical to the access point AP2, and the station STA1 and the station STA2 can establish connection (that is, BCN1=BCN2), the station STA1 and the station STA2 establish DLS.

Note that, the process 60 illustrates the channel status determination method of the present invention when applying to DLS, and can further include other steps/functions if necessary. For example, the step 602 can be realized by following operations. When the user of the station STA1 starts DLS through a specific function key or software, the station STA1 first checks if the access point AP1 supports DLS. If yes, the station STA1 can hint the user to start DLS of the station STA2. Meanwhile, a timing mechanism can be added, for example, to start a timer with a predefined timing duration and stop DLS while the timer expires, so as to avoid successive operations being malfunctioned due to channel interference, or inactivation of DLS of the station STA2. On the contrary, when the station STA1 and the station STA2 establish DLS successfully, the timer should be stopped.

In the step 604, the station STA1 and the station STA2 forward beacons to determine whether the access point A1 and the access point A2 are identical and whether the channel status is feasible to establish connection, and in implementation, a mechanism for identifying beacon packets can be added. In addition, in some circumstances, there may be another station forwarding beacons at the same time; thereof, in order to avoid problems in DLS operations, the step 606 can further include a limitation condition, to ensure that there are only two stations performing DLS in a service area of an access point (basic service set).

Moreover, when the station STA1 and the station STA2 establish DLS, an embodiment of the present invention can set the station with a larger MAC address to output a DLS request message DLS_Request through the access point to the other station, while the station with a smaller MAC address sends back a response message DLS_Response accordingly, to complete DLS establishment. In this way, the user does not need to enter the MAC addresses of the stations STA1 and STA2, to enhance the convenience.

Furthermore, after the station STA1 and the station STA2 establish DLS, a channel status determination mechanism similar to the step 604 can also be added. For instance, the station STA1 and/or the station STA2 can output a NULL packet (meaning a frame with the frame body field 502 of a zero length, as shown in FIG. 5) periodically or after a predefined duration that no transmission occurs, to evaluate the effectiveness of DLS. Certainly, the beacon packet can be taken as an evaluating packet, while data throughput and overhead will be increased.

Figure 7:
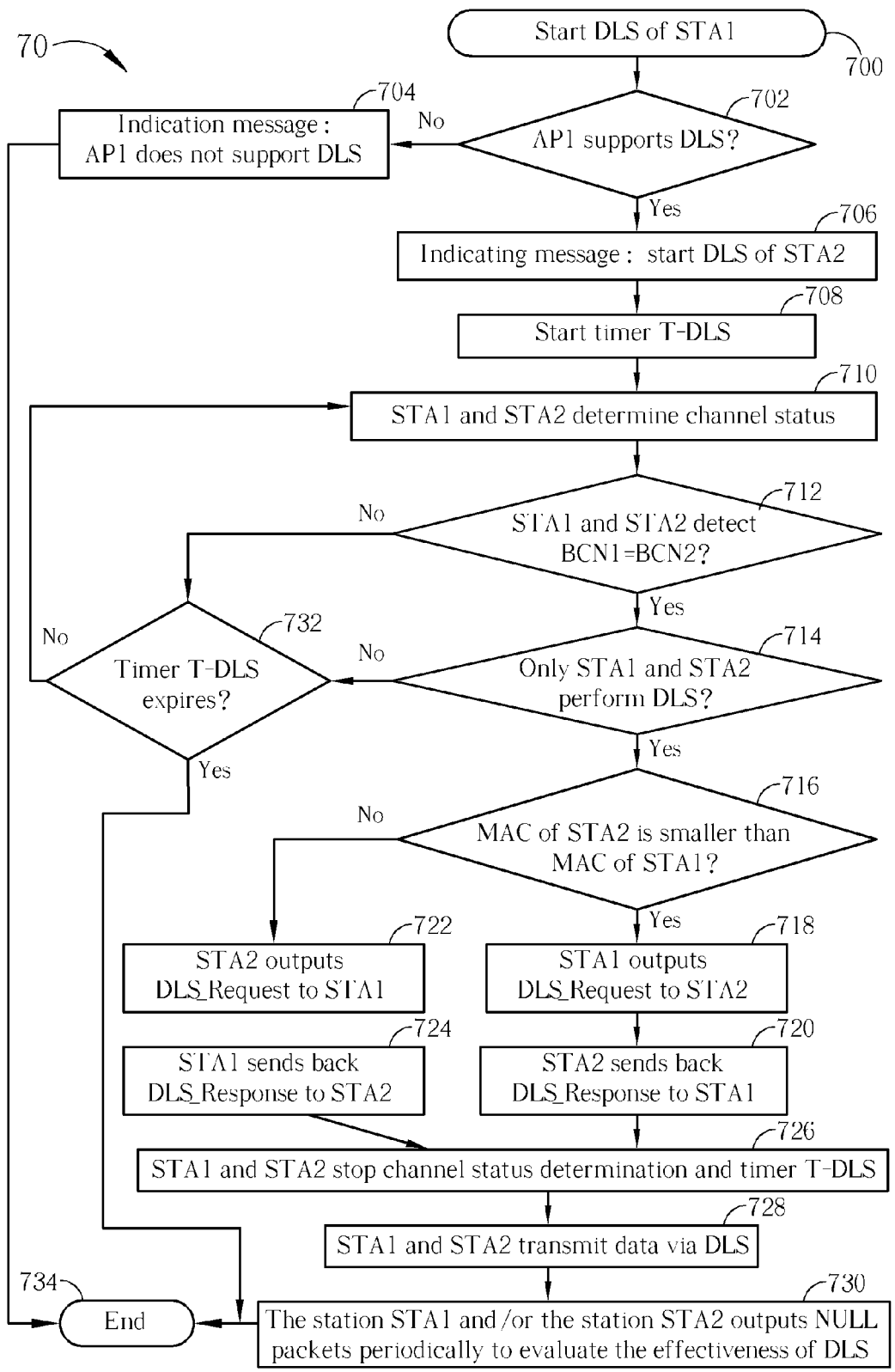
FIG. 7 is a flowchart of a process according to an embodiment of the present invention.

The above deviations of the process 60 can be summarized into a process 70, as shown in FIG. 7. The process 70 comprises the following steps:

Step 700: The user starts DLS of the station STA1.

Step 702: Determine if the access point AP1 supports DLS. If yes, go to step 706; else, proceed to step 704.

Step 704: Generate an indication message indicating that the access point AP1 does not support DLS.

Step 706: Generate an indication message indicating the user to start DLS of the station STA2.

Step 708: Start a timer T-DLS with a predefined timing duration.

Step 710: The station STA1 and the station STA2 determines the channel status, i.e. the station STA1 and the station STA2 broadcast the packet PKT1 and the packet PKT2 relatively, and compare the beacons of the packets with the beacons outputted from the access points.

Step 712: Determine whether the station STA1 and the station STA2 detect the conformation of the beacon BCN1 and the beacon BCN2. If yes, proceed to step 714; else, go to step 732.

Step 714: Determine whether there are only the station STA1 and the station STA2 performing DLS. If yes, proceed to step 716; else, execute step 732.

Step 716: Determine whether the MAC address of the station STA2 is smaller than that of the station STA1. If yes, proceed to step 718; else, go to step 722.

Step 718: The station STA1 outputs a DLS request message DLS_Request to the station STA2.

Step 720: The station STA2 sends back a DLS response message DLS_Response to the station STA1.

Step 722: The station STA2 outputs a DLS request message DLS_Request to the station STA1.

Step 724: The station STA1 sends back a DLS response message DLS_Response to the station STA2.

Step 726: The station STA1 and the station STA2 stop the channel status determination and stop the timer T-DLS.

Step 728: The station STA1 and the station STA2 transmit data via DLS.

Step 730: The station STA1 and/or the station STA2 outputs NULL packets periodically to evaluate the effectiveness of DLS.

Step 732: Determine whether the timer T-DLS expires. If yes, proceed to step 734; else, go to step 710.

Step 734: End.

According to the process 70, when establishing DLS, the station STA1 and the station STA2 determine whether the corresponding channel is feasible to establish the connection between the station STA1 and the station STA2 by forwarding beacons. If the channel is feasible to establish the connection, and there are only the station STA1 and the station STA2 performing DLS in the same single basic service set, the DLS request message DLS_Request is outputted from the station with a larger MAC address, and the DLS response message DLS_Response is outputted by the station with a smaller MAC address. When DLS is successfully established, the station STA1 and/or the station STA2 outputs NULL packets periodically to evaluate the effectiveness of DLS. In addition, when the station STA1 starts to establish DLS, the timer T-DLS is started. When DLS is successfully established, the timer T-DLS is stopped. During the procedure of determining the channel status, if the timer T-DLS expires, meaning that the station STA1 and the station STA2 cannot establish DLS in the predefined duration, the process 70 is stopped.

To sum up, comparing to the prior art, the DLS establishing method of the present invention has the following advantages:

First, the channel status determination process can determine the channel status between stations, avoiding the situation that "the transmission condition between two STAs is not qualified to establish DLS but still established", to ensure DLS being accurately established.

Second, the user does not need to acquire MAC addresses of stations, which enhances utilization convenience.

Third, the timing mechanism timely interrupts the process, to enhance the effectiveness.

Fourth, the evaluating process evaluates the effectiveness of DLS, to maintain correct operations of DLS.

In conclusion, the present invention provides a basis to determine the channel status by forwarding beacons outputted from access points, and the determination results can be further utilized in other applications, such as DLS, to enhance convenience.

Those skilled in the art will readily observe that numerous modifications and alterations of the device and method may be made while retaining the teachings of the invention.

What is claimed is:

1. A method for determining a channel status between a first station and a second station in a wireless local area network system, comprising:
    the first station receiving a first beacon from an access point;
    the first station receiving a packet outputted by the second station, the packet carrying a second beacon; and
    the first station comparing the first beacon from the access point with the second beacon from the second station, to determine the channel status between the first station and the second station, wherein the channel status is used for determining whether to establish a direct link setup (DLS) between the first station and the second station, and the first station and the second station are non-access point stations.

2. The method of claim 1, wherein a plurality of fields of the packet are set to specific values, so that the first station is capable of determining that the packet is used for determining the channel status between the first station and the second station.

3. The method of claim 1, wherein the step of the first station comparing the first beacon with the second beacon to determine the channel status between the first station and the second station comprises the first station determining that establishing a connection between the first station and the second station is feasible, when the first beacon and the second beacon are identical.

4. The method of claim 3, wherein the first station further determines that the first station and the second station are served by the same access point, when the first beacon and the second beacon are identical.

5. The method of claim 1, wherein the step of the first station comparing the first beacon with the second beacon to determine the channel status between the first station and the second station comprises the first station determining that establishing a connection between the first station and the second station is unallowable, when the first beacon and the second beacon are not identical.

6. A wireless local area network system, comprising:
a plurality of stations; and
at least one access point, for providing services to the plurality of stations; wherein while a first station of the plurality of stations determines a channel status between the first station and a second station, the second station broadcasts a second packet carrying a second beacon, so that the first station is capable of comparing a first beacon with the second beacon, and determining the channel status between the first station and the second station, wherein the channel status is used for determining whether to establish a direct link setup (DLS) between the first station and the second station;
wherein the second beacon is outputted by an access point corresponding to the second station, and the first beacon is outputted by an access point corresponding to the first station, and the first station and the second station are non-access point stations.

7. The wireless local area network system of claim 6, wherein the second station further sets values of a plurality of fields of the second packet, so that the first station is capable of determining that the second packet is used for determining the channel status between the first station and the second station.

8. The wireless local area network system of claim 6, wherein the first station determines that establishing a connection between the first station and the second station is feasible, when the first beacon and the second beacon are identical.

9. The wireless local area network system of claim 8, wherein the first station further determines that the first station and the second station are served by the same access point, when the first beacon and the second beacon are identical.

10. The wireless local area network system of claim 6, wherein the first station determines that establishing a connection between the first station and the second station is unallowable, when the first beacon and the second beacon are not identical.

11. A method for establishing a direct link setup (DLS) in a wireless local network system, comprising:
a first station and a second station starting to establish the DLS;
the first station broadcasting a plurality of first packets carrying a plurality of first beacons outputted by a first access point (AP), and the second station broadcasting a plurality of second packets carrying a plurality of second beacons outputted by a second AP, to determine whether the first AP is identical to the second AP and a channel status between the first station and the second station; and
the first station and the second station establishing the DLS when the first AP is identical to the second AP, and the channel status between the first station and the second station is determined as feasible to establish a connection, wherein the first station and the second station are non-access point stations.

12. The method of claim 11, wherein the first station compares the plurality of first beacons outputted by the first AP with the plurality of second beacons carried by the plurality of second packets broadcasted by the second station, and determines that the first AP is identical to the second AP and the channel status between the first station and the second station is feasible to establish the connection when the plurality of first beacons and the plurality of second beacons are identical.

13. The method of claim 11, wherein the second station compares the plurality of second beacons outputted by the second AP with the plurality of first beacons carried by the plurality of first packets broadcasted by the first station, and determines that the first AP is identical to the second AP, and the channel status between the first station and the second station is feasible to establish the connection when the plurality of first beacons and the plurality of second beacons are identical.

14. The method in claim 11, wherein the first station further sets values of a plurality of fields of each of the first packets when the first station has the plurality of first beacons, outputted by the first AP, be carried by the plurality of first packets, so that the second station is capable of determining that the plurality of first packets are used for determining the channel status between the first station and the second station.

15. The method in claim 11, wherein the second station further sets values of a plurality of fields of each of the second packets when the second station has the plurality of second beacons, outputted by the second AP, be carried by the plurality of second packets, so that the first station is capable of determining that the plurality of second packets are used for determining the channel status between the first station and the second station.

16. The method of claim 11, further comprising starting a timer when the first station and the second station start to establish the DLS.

17. The method of claim 16, further comprising stopping the DLS when the timer expires.

18. The method of claim 16 further comprising stopping the timer when the first AP is identical to the second AP and the channel status between the first station and the second station is determined as feasible to establish the connection.

19. The method of claim 11, wherein the step of the first station and the second station establishing the DLS comprises:
a station of the first station and the second station having a greater media access control (MAC) address outputting a DLS request message to the other station via a corresponding AP;
the other station of the first station and the second station sending a DLS response message through the AP after receiving the DLS request message; and
the first station and the second station establishing the DLS.

20. The method of claim 11, further comprising the first station and/or the second station periodically sending a verification packet to verify a validity of the DLS after the first station and the second station establish the DLS.

21. The method of claim 20, wherein the verification packet is a null packet.

\* \* \* \* \*